United States Patent [11] 3,573,353

[72] Inventors Frederick C. Henriques
Washington, D.C.;
George B. Parrent, Jr., Carlisle; Edmund
L. Bouche, Lexington, Mass.
[21] Appl. No. 691,567
[22] Filed Dec. 18, 1967
[45] Patented Apr. 6, 1971
[73] Assignee Technical Operations, Incorporated
Burlington, Mass.

[54] OPTICAL DETECTION SYSTEM AND METHOD WITH SPATIAL FILTERING
13 Claims, 10 Drawing Figs.

[52] U.S. Cl. ...... 178/5.4, 350/162, 353/20, 353/99
[51] Int. Cl. ...... G02b 27/38, H04n 9/08
[50] Field of Search ...... 350/162, 162 (SF); 178/5.4 (C.R), 5.4 (4 (TCC)); 95/12.2

[56] References Cited
UNITED STATES PATENTS

| | | | |
|---|---|---|---|
| 2,082,579 | 6/1937 | Jacobsen | 95/12.20 |
| 3,108,383 | 10/1963 | Gabor | 350/162X |
| 3,196,205 | 7/1965 | Bedford | 178/5.4(4TCC) |
| 3,314,052 | 4/1967 | Lohmann | 350/162X |
| 3,408,143 | 10/1968 | Mueller | 95/12.2X |
| 3,409,872 | 11/1968 | Hogg et al. | (350/162)UX |
| 3,425,770 | 2/1969 | Mueller et al. | 350/162 |
| 2,189,751 | 2/1940 | Bocca et al. | (350/162SFUX) |
| 3,335,413 | 8/1967 | Glenn | (350/162SFUX) |
| 3,470,310 | 9/1969 | Shashoua | (350/162SFUX) |
| 3,497,704 | 2/1970 | Holmes et al. | (350/162SFUX) |

*Primary Examiner*—John K. Corbin
*Attorneys*—Alfred H. Rosen and John H. Coult

ABSTRACT: This disclosure depicts method and apparatus for the optical detection at distinct detection planes of a plural number of distinct images from a record encoded with a plurality of superimposed images multiplied, respectively, with a unique spatially periodic modulation. More particularly, this disclosure depicts method and apparatus for optical image detection which is especially useful in color television film reproduction, simultaneous color separation photography, or the like. The depicted method and apparatus involves Fourier transforming a modulated record to separate in optical channels in transform space spatial frequency spectra of stored images encoded on the record, spatial filtering the transform pattern, and simultaneously detecting distinct images carried in the separated optical channels. Cathode ray pickup tubes and photosensitive emulsions are shown and described as alternative ways for separately photodetecting the images carried in the respective channels formed.

INVENTORS.
*Frederick C. Henriques*
*Edmund L. Bouché and*
*George B. Parrent, Jr.*
*BY* Alfred H. Rosen
and John H. Coult
ATTORNEYS INVENTORS.
*Frederick C. Henriques*
*Edmund L. Bouché and*
*George B. Parrent, Jr.*
BY
Alfred H. Rosen
and John H. Coult
ATTORNEYS INVENTORS.
Frederick C. Henriques
Edmund L. Bouché and
George B. Parrent, Jr.
BY
Alfred H. Rosen
and John H. Coult
ATTORNEYS

OPTICAL DETECTION SYSTEM AND METHOD WITH SPATIAL FILTERING

BACKGROUND OF THE INVENTION

This invention concerns method and apparatus for analyzing photographic records having a plurality of superimposed images encoded thereon and for retrieving separate images in separate information channels. In one application of the inventive concepts, the plurality of superimposed images encoded on the record represent color separation images. In accordance with preferred embodiments of this invention, the color separation images are retrieved in individual information channels which are utilized independently for making color separation records, or alternatively, which may be fed into the input of a color television film reproduction camera chain.

Regarding such a color television camera application, conventional color television film reproduction systems involve transilluminating a color transparency having color values corresponding to color values in the photographed scene to erect an image of the transparency record at the field lens at the input to a camera chain, which for example, might be an RCA TK–27 color film camera of the parallel monochrome type. The image erected at the field lens is amplitude divided by a beam splitter and then spectrally trisected by two dichroic mirrors which analyze the image in terms of its primary color content. The image at the field lens is thus separated into four components — one monochrome component and three primary color components. An objective lens in each of the four channels images the reconstruction at the field lens, filtered as described, upon the screen of a separate vidicon tube.

One particularly expedient application of the subject invention involves a novel interfacing of a parallel monochrome-type color television camera chain with image projection apparatus having the capability of simultaneous and separate retrieval of the plurality of color separation image spectra into a plurality of color channels and a monochrome channel without the need for a beam splitter and dichroic mirrors.

Conventional color television film reproduction systems have a number of inherent drawbacks. One drawback concerns their requirement for projection lens, field lens, beam splitter, a plurality of dichroic mirrors, and an objective lens. Each of these optical elements which must be employed between the film record and the vidicon screen will deteriorate the quality of the screen image and will absorb a quantity of the beam energy.

A direct mating in the conventional manner of a coherent projection system of the type described hereinafter with a color television chain would involve additional spectral filtering with resulting further energy losses.

OBJECTS OF THE INVENTION

It is an object of this invention to provide method and apparatus for retrieving in individual optical channels distinct image information from a record comprising a plurality of superimposed images respectively multiplied with a unique spatially periodic modulation, and for photodetecting the information in each channel at a distinct detection plane.

It is another object of this invention to provide method and apparatus for individually retrieving at distinct detection planes a plurality of color separation images stored in superposition upon a colorless record in respective multiplication with a unique spatially periodic modulation for use in color television film reproduction, simultaneous color separation photography, or the like. It is an object to also retrieve composite monochrome or luminance information in yet another distinct optical channel for use along with the color separation channels.

It is an object of this invention to provide method and apparatus by which a spectrum of spatial frequencies associated with each of a plurality of color separation images stored in superposition upon a record in respective multiplication with a unique periodic modulation may be retrieved in individual information channels and transmitted directly to cathode ray pickup tubes in a color television camera chain without the need for intermediate image reconstruction and spectral analysis.

It is thus an object to provide a color television film reproduction system in which no beam amplitude dividing or color analyzing elements are required, and which is thus more compact than conventional systems now in use.

It is still another object of this invention to provide method and apparatus for extracting from a single colorless record containing a plurality of superimposed color separation images respectively impressed with a unique spatial modulation a plurality of optical channels carrying color separation information, or alternatively, a monochrome channel carrying information representing the sum of the color separation information.

Further objects and advantages of the invention will be obvious and will in part become apparent as the following description proceeds.

The features of novelty which characterize the invention will be pointed out with particularity in the claims annexed to and forming a part of this specification.

SUMMARY OF THE INVENTION

This invention concerns method and apparatus for retrieving at distinct detection planes a plural number of distinct images from a record comprising a plurality of superimposed images multiplied respectively with a unique spatially periodic modulation for use in color television film reproduction, simultaneous color separation photography, or the like. The invention, in one aspect, involves illuminating such a record along a primary optical axis with a beam of light having at least partial coherence at the record; forming in a Fourier transform space diffraction patterns of the record spatial frequencies respectively associated with each of the superimposed images; selectively passing at least one diffracted order to provide an information channel containing a spectrum of spatial frequencies; optically deflecting from a point in the vicinity of said transform space the light constituting said transmitted diffracted order along a channel axis angled with respect to said primary optical axis; focusing the light constituting said transmitted diffracted order to form a reconstruction image at a detection plane; and photodetecting the intensity distribution in said reconstruction image.

BRIEF DESCRIPTION OF THE DRAWINGS

For a fuller understanding of the invention, reference may be had to the following detailed description taken in connection with the accompanying drawings wherein.

DESCRIPTION OF THE PREFERRED EMBODIMENTS

Figure 1:
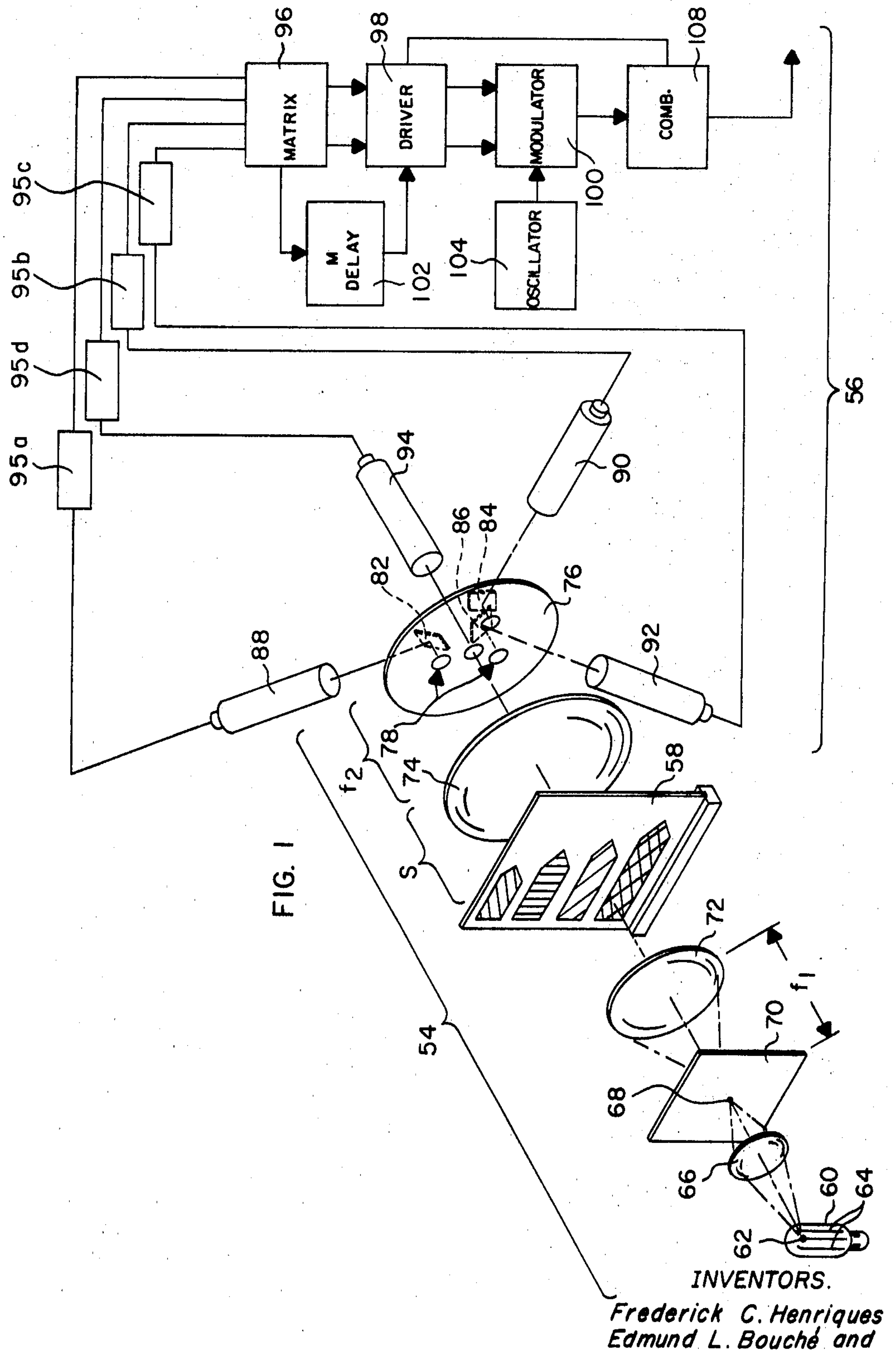
FIG. 1 is a schematic distorted scale perspective view of a color television film reproduction system which may be constructed in accordance with the teachings of the invention.
Figure 2:
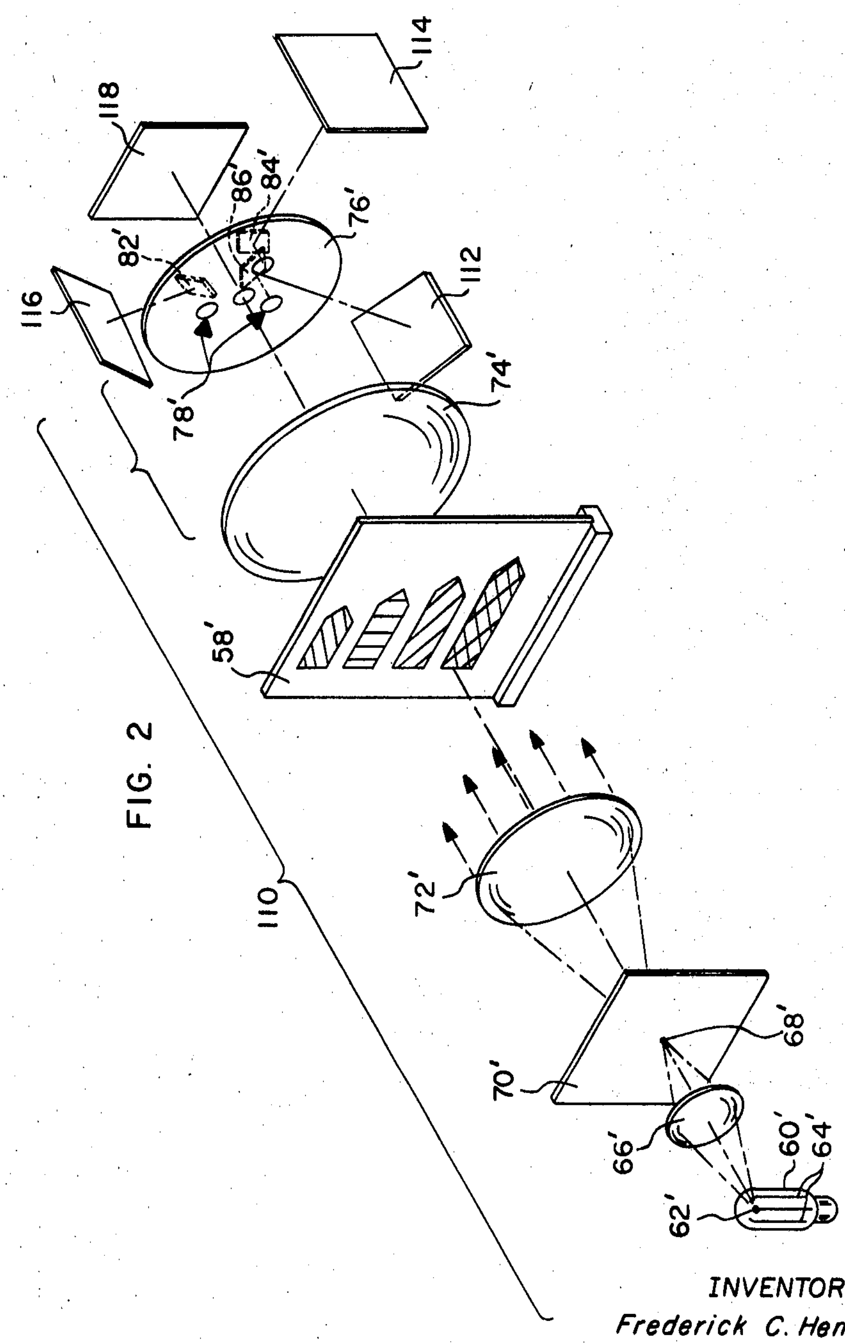
FIG. 2 is an alternative implementation of the inventive concepts for retrieving in separate information channels the spatial frequency spectra of each of a plurality of superimposed component record images and for making separate exposures on photosensitive materials of the separately retrieved component record images.

Two of the many possible implementations of the inventive concepts are shown in FIGS. 1 and 2. FIG. 1 depicts the interfacing of a coherent optical projection system with a parallel monochrome-type studio color television camera chain in accordance with the teachings of this invention. The FIG. 2 embodiment depicts a utilization of the inventive principles for simultaneously making at distinct detection planes color separation exposures or a monochrome exposure comprising a composite of the color separation exposures from a record upon which color separation images are recorded in superimposed relationship in respective multiplication with a unique spatial modulation. Before a full understanding of the invention may be achieved, it is important that the reader have a general familiarity with the spectral zonal photographic and display concepts involved. Thus, before undertaking a detailed explanation of the invention and its contemplated modifications and implementations, a general discussion of the involved spectral zonal photography and display employed will first be undertaken. In connection therewith, reference may be had to FIGS. 3—7.

Figures 3, 4A, 4B, 4C, 4D, 5, 6, 7:
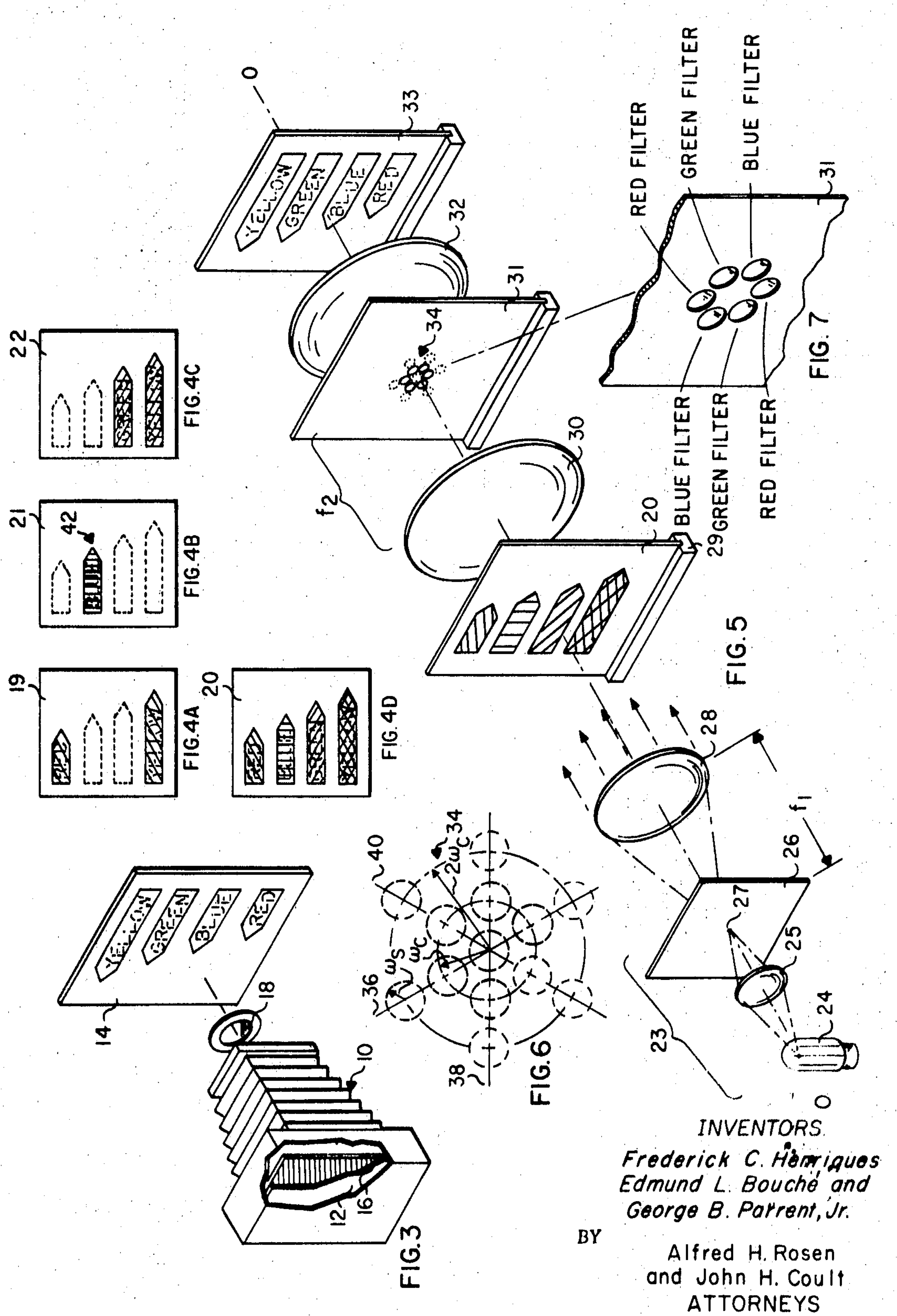
FIG. 3 is a distorted-scale schematic perspective view of a colored object and photographic camera which might be used for forming photographic records of the object in accordance with prior art techniques of spectral zonal photography; the view shows the camera partially broken away to reveal a photographic recording material and a diffraction grating which would be otherwise hidden within the interior of the camera.
FIG. 4A—4D show individual and composite color separation records of the object being photographed, each of the individual records being associated with a particular zone of the visible spectrum and with a periodic modulation distinctive by its relative azimuthal orientation.
FIG. 5 is a distorted-scale schematic perspective view of a prior art projection display apparatus for displaying photographic records of the above-described type.
FIG. 6 is a front elevation view, schematic and grossly simplified for ease of understanding, of Fraunhofer diffraction patterns which might be formed in a Fourier transform space in the apparatus of FIG. 5.
FIG. 7 is a schematic perspective view, enlarged and partially broken away, of a spatial filter shown in FIG. 5.

FIG. 3 shows in very schematic form a photographic camera 10 which might be employed to form a spectral zonal spatially periodically modulated photographic record of the type utilized in the present invention. The record may be formed as a composite of three separate color separation exposures of a photosensitive film 12 in the camera 10. The separate color separation records thus formed are respectively associated with a spatial periodic modulation, imposed, for example, by a diffraction grating 16 adjacent the film 12, which is unique in terms of its relative azimuthal orientation.

FIG. 3 depicts the first step of a multistep operation for forming such a composite record. An object 14, illustrated as having areas of predominantly yellow, green, blue, and red spectral reflectance characteristics, as labeled, is photographed through a filter 18 having a spectral transmittance peak in the red region of the visible spectrum. A grating 16 having a line orientation sloping, for example, at 30° to the horizontal, from upper right to lower left (as the grating would appear if viewed from the back of the camera), is juxtaposed with the film 12 to effect a superposition of a shadow image of the grating 16 on the red light image of object 14. The resulting color separation record 19 associated with the red content in the object 14, processed to a positive, for example by reversal processing techniques, would appear as shown in FIG. 4A. The object appears inverted, of course, because of the property of the objective lens of rotating the image 180°. It is seen from FIG. 4A that the grating modulation is superimposed upon the object detail associated with light having a red spectral content. Note that because of the red constituent of yellow light, the yellow area in the object 14 is also imaged with superimposed grating lines of like angular orientation.

To complete the formation of a composite photographic record, as shown in FIG. 4D at 20, color separation exposures are then made successively through a filter having a spectral transmittance characterized by a blue dominant wavelength with a diffraction grating oriented vertically, and then finally through a filter having a spectral transmittance dominant in the green region of the spectrum with a diffraction grating having a grating orientation sloping from the upper left to lower right, for example, at 30° to the horizontal.

It is seen from FIG. 4B that the blue color separation record 21 does not result in the exposure of any part of the film 12 not associated with blue content in the object 14; however, on exposure to the object 14 through a green filter, the yellow area is again exposed with grating image superimposed thereon with an orientation associated with the green color separation record 22. Thus, as shown in FIG. 4D, the object area having yellow spectral content has superimposed thereon spatial periodic modulations associated with both the red and green color separation records.

Apparatus for displaying such a photographic record is known to the prior art and may take the form shown in FIG. 5. Such display apparatus includes a source 23 of partially coherent light, illustrated as comprising an arc lamp 24, a condenser lens 25 and a mask 26 having an aperture 27 of restricted diameter. A lens 28 is provided for effectively transporting the point light source formed to a far field, which may be either real or virtual, as desired. A film gate 29 for supporting a transparency record to be displayed, a transform lens 30 (explained below), a Fourier transform filter 31 (explained below), a projection lens 32, and a display screen 33 complete the display apparatus.

Upon illumination of a transparency record, such as composite record 20, in film holder 29, as a result of diffraction and interference phenomena and the relative angular displacement between the periodic modulations respectively associated with the color separation records 19, 21, and 22, three angularly displaced multiorder diffraction patterns, collectively designated by reference numeral 34, will be produced. Each of the separate diffraction patterns associated with a separate color separation record contains a zeroth order which is spatially coextensive with the zeroth order (undiffracted) components of each of the other patterns, and a plurality of higher order (diffracted) components each containing the related color object spatial frequency spectrum modulating a carrier having a frequency equal to a multiple of the grating fundamental frequency, the value of the multiple being a function of the diffraction order $m$.

By the use of transform lens 30 these diffraction patterns are formed within the confines of the projection system in a space commonly known as the Fourier transform space. It is thus termed because of the spatial and temporal frequency analysis which is achieved in this plane by the described diffraction and interference effects. Through the use of spatial and spectral filtering of these patterns in the transform plane, one or more of the discrete records may be displayed, for example, to achieve a reconstitution of the original scene in true color or in a color of a selected spectral composition.

The nature of the Fourier transform space and the effects that may be achieved by spatial filtering alone or by spatial and spectral filtering in this space of a selected diffraction order or orders may be understood by reference to FIG. 6 showing an enlarged frontal view of hypothetical diffraction patterns which might be formed in the transform space of the projection system described above. FIG. 6 shows three angularly separated diffraction patterns corresponding to the red, green, and blue light object spatial frequency spectra lying along axes labeled 36, 38, and 40, respectively. Each of the axes 36, 38, and 40 is oriented orthogonally to the periodic modulation on the associated color separation record. The diffraction patterns share a common zeroth order location but have spatially separated higher orders.

By the nature of diffraction phenomena, the diffraction angle $\alpha$ is:

$$\alpha=\lambda\ \omega$$

where $\lambda$ represents the spectral wavelength of the illumination radiation and $\omega$ represents spatial frequencies. Assuming the light at the film gate 29 to be collimated, the diffraction orders will be formed in the transform space at the delta function positions determined by the transform of the record modulation at radial distances from the pattern axis:

$$R=f_2 m \omega_c$$

where $f_2$ is the focal length of lens 30; $\bar{\lambda}$ is the mean wavelength of the illuminating radiation; $_s$ represents the diffraction order; and $\omega_c$ is the fundamental grating frequency. though The first orders of each of the diffraction patterns can be considered as being an object spatial frequency spectrum of maximum frequency $\omega_s$ (representing a radius of the order) convolved with a carrier of spatial frequency $\omega_c$. The second order components can be thought of as being the convolution of an object spectrum having a maximum spatial frequency $\omega_s$ with a carrier having a spatial frequency of $2\omega_c$, and so forth. Thus, the various orders of each diffraction pattern may be thought of as being harmonically related, with a spatial frequency $\omega_c$, or an even multiple thereof, acting as a carrier for the spectrum of spatial frequencies characterizing the object detail. Two orders only are shown; however, it should be understood that even higher orders are present, but will be of increasingly less intensity.

Spatial filtering of the diffraction patterns is achieved by placing the apertured transform filter 31 in the transform space, as shown in FIG. 5. Since the zeroth order components of the diffraction patterns are spatially coextensive, the spatial frequencies contained in the zeroth order information channel represents the sum of the object spectra respectively associated with each of the color separation records, 19, 21, and 22. Thus an opening in the transform filter 31 at the zeroth order location would result in a composite image of object 14 being formed in tones of grey, black, and white. Because the information channels associated with each of the color separation records are inseparably commingled in the zeroth order, they cannot be properly recolored to effect a faithful color reproduction of the photographed object. However, at the higher orders, because of the angular displacement of the red, blue, and green-associated axes 36, 38, and 40, the proper spectral characteristic may be added to each of the information channels by appropriate spectral filtering.

FIG. 7 represents an enlargement of a central portion of filter 31, illustrating appropriate spatial filtering apertures with the correct spectral filters to effect a true color reproduction of the object. It should be understood, of course, that higher order components, appropriately spectrally filtered, could also be passed, if desired. However, to maintain the discussion at a fundamental level, utilization of only the first order diffraction components has been illustrated.

Consider now a trace of the projection illumination as it traverses the projection system. The lamp 24 and condenser lens 25 are designed to evenly illuminate aperture 27 in mask 26 with a beam of maximum intensity broadband luminous energy. Lens 28 is shown spaced axially from mask 26 a distance substantially equal to its focal length in order that the light illuminating the film gate is substantially collimated. Transform lens 30 30 collects the substantially planar wave fronts in the zeroth order and diffracted higher orders and brings them to a focus in transform space in the aperture of the projection lens 32. The lenses 28 and 30 may be thus thought of as cooperating to image the illuminated aperture 27 in mask 26 on the transform filter 31.

It is evident that the display of photographic records of the above-described type is hampered by the low levels of image brightness which may be obtained. An important constraint on the image brightness results from a requirement that the effective source must not exceed a predetermined maximum size to prevent overlap, and thus "cross talk" between the diffraction orders. It is seen that the center of each of the higher orders of a diffraction pattern is spaced radially from the pattern axis by an integral multiple of the carrier frequency $\omega_c$ and that the radius of each of the orders corresponds to spatial frequency $\omega_s$. To prevent overlap between the zeroth and higher orders, $\omega_c$ must be greater than, or at least equal to $2\omega_s$. (This may be thought of as a version of the sampling theorem). Since each diffraction order is an image of the illuminated aperture 27 in mask 26 magnified by the ratio $f_2/f_1$, it follows then that the diameter $d$ of the aperture 27 in mask 26, and thus the total light flux transmissible through the aperture 27, is constrained in accordance with the relationship (assuming collimated light at the film gate 29);

$$d=f_1\bar{\lambda}\,\omega_c$$

where $f_1$ represents the focal length of lens 28, and $\lambda$ and $\omega_c$ are as indicated above.

The illuminance of the film gate by the collimator is:

$$E=\frac{Bd^2}{4f_1^2}\pi$$

where B is the source photometric brightness (luminance) in candles/cm$^2$. Substituting for $d$ from above;

$$E=\frac{\pi B\bar{\lambda}^2\omega_c^2}{4}$$

This relation clearly illustrates that an increase in the brightness of displayed images can be obtained only at the cost of increasing the source brightness B or the grating frequency $\omega_c$.

With an understanding of the nature of the involved spectral zonal photography and display utilizing spatial carriers and spectral filtering techniques, reference is now made to FIG. 1 showing a preferred embodiment of the inventive concepts. FIG. 1 depicts a color television film reproduction system comprising an input section, designated generically by reference number 54, and a parallel monochrome-type color television camera chain, designated generally by reference number 56.

The input section 54 constitutes in effect an optical decoding apparatus for retrieving the component color separation images from a record 58 of the type described above and for delivering to the chain 56 in separate optical channels the spectra associated with each color separation image and with a composite monochrome image.

The input section 54 may comprise a projection lamp 60, such as an xenon arc lamp, producing an intense arc 62 between electrodes 64. A condensing lens 66 produces an image of the arc 62 upon an aperture 68 of restricted size in a mask 70 thus creating, in effect, a point source of intense illumination. A collimating lens 72 disposed a focal length $f_1$ away from the mask 70 substantially collimates the radiation emanating from the apertures 68.

A beam of collimated radiation is projected through the transparency record 58 whereupon it is collected by a projection lens 74 disposed a distance $s$ from the record 58. As described above, Fraunhofer diffraction patterns are formed at a distance $f_2$ from the projection lens 74 equal to the focal length of the lens 74 in a space termed the Fourier transform space.

Thus, in transform space the spectrum of spatial frequencies for each color separation record is convolved with a delta function array oriented along a diffraction axis whose direction corresponds to the vectorial direction of the modulation on the associated color separation record. Thus a transform spatial filter 76, as shown, having angularly spaced filter apertures 78 located at the respective position of one of the first diffraction orders of each of the angularly displaced diffraction patterns will effect detection of the red, blue, and green record information. An aperture at the zeroth order location transmits the DC spectra comprising a sum of the spectra associated with each of the color separation images, and thus provides a monochrome channel.

As is well-known, if the spectra transmitted through the filter 76 are allowed to propagate without interference, a monochrome reconstruction of the record will be erected at the image plane of the projection lens 74. In such event the information in each of the optical channels spatially separated in transform space is combined and the value of having separated the record information respectively associated with the superimposed component images thereon is lost.

In accordance with this invention, the spatially separated diffracted optical channels are deflected away from the primary optical axis 0–0 from points in the vicinity of the transform space by three light deflecting elements such as mirrors 82, 84, and 86. The DC spectra is allowed to pass unobstructed to the focal plane of the projection lens 74. Thus, by this expedient, four information channels are formed, three containing the respective color separation spectra of spatial frequencies and the fourth containing a sum of the spectra associated with the color separation images.

By this invention the four information channels provided at the output of the input section 54 are fed directly to the four vidicons in a parallel monochrome-type color television chain 56. With this novel arrangement, there is eliminated the need for spectral filtering at each of the spatial filter apertures 78 in filter 76 in the transform space. Further, there is no longer a need for the dichroic mirrors which are required in the conventional camera chain. By eliminating these spectral filters, the field lens at the input to a conventional camera chain, and the objective lenses which image the field lens upon the screen of each of the four vidicons, the screen images formed are of enhanced intensity and resolution. Further, the elimination of the dichroic mirrors and beam-splitter allows far greater compactness of the camera chain console.

Thus by the illustrated implementation of the invention, color separation images are formed on the screens of the vidicons 88, 90, and 92, and a monochrome image is formed directly on the screen of vidicon 94. The illustrated camera chain from this point on is conventional. At the output of the red, blue, green and monochrome vidicons are produced respective color separation signals and a monochrome signal. Each of the signals passes into a processing and amplifying circuit, designated **95*a*, 95*b*, 95*c*, and 95*d*, respectively, in which the signals receive, inter alia, video preamplification and amplification, video signal clamping and gamma correction. Color balancing or control of other signal characteristics may be achieved by appropriate adjustments in these modules. The RGBM signals are fed into a matrixing circuit 96 for matrixing the color signals to produce I and Q signals which are fed to a driver circuit 98. The driver circuit 98 amplifies the M signal and drives an M delay module 102 receiving an input from the matrixing circuit 96. The M delay module 102 delays the M signal to match the Q filter delay. The I and Q signals are fed from the driver circuit 98 to a balanced modulator circuit 100**.

The modulator circuit 100, receiving a pair of 90° phase-spaced 3.58 megacycle subcarrier signals from a subcarrier oscillator 104, modulates the I and Q signals upon the subcarrier to produce the chroma signal. The M signal from the driver circuit 98 and the chroma signal from modulator circuit 100 are combined and appropriate sync and blanking signals added in a circuit module 108 to form a composite video signal for delivery to transmitting equipment.

An alternative implementation of the inventive concept is illustrated in FIG. 2. The FIG. 2 embodiment comprises an input section 110 which is substantially like the input section 54 shown in the FIG. 1 embodiment. However, the FIG. 2 embodiment illustrates apparatus whereby simultaneous color separation and monochrome exposures may be made on photosensitive material located at the respective image planes of the projection lens 74. Each of the elements in the FIG. 2 embodiment having the same function as the corresponding elements in the FIG. 1 embodiment are given the same reference numeral, but primed. By this embodiment of the invention, a red color separation record may be formed by exposing a photosensitive material 112 at the location of the red color separation image erected in space by the projection lens 74'. Correspondingly, blue and green color separation images may be formed on photosensitive materials 114 and 116 located at the position in space of the blue and green color separation images erected by the projection lens 74'. A monochrome image comprising the sum of the color separation images may be recorded on photosensitive materials 118 located on the primary optical axis of this system at the focal plane of the projection lens 74'.

Structural implementations other than and different from those described above are within the purview of this invention. For example, other means such as prisms may be employed for deflecting at the transform space the spatially separated spectra corresponding to the component record images. Rather than picking off one of the associated pairs of diffraction orders, as shown, it is contemplated that both orders may be transmitted through the spatial filter in transform space (for example, filter 76 in FIG. 1) and deflected to the same detection plane.

The invention is not limited to the particular details of construction of the embodiments depicted and it is contemplated that various and other modifications and applications will occur to those skilled in the art. Therefore because certain changes may be made in the above-described apparatus and method without departing from the true spirit and scope of the invention herein involved, it is intended that the subject matter of the above depiction shall be interpreted as illustrative and not in a limiting sense.

We claim:

1. A method for retrieving at distinct detection planes a plurality of component record images stored on a record in superposition and in respective multiplication with a unique spatially periodic modulation, said method comprising:

illuminating the record along a primary optical axis with a beam of light having at least partial coherence at the record;

forming in a Fourier transform space a corresponding plurality of diffraction patterns of the record spatial frequencies each including a multiorder Dirac delta function array produced by a periodic modulation on the record convolved with the spectra of a different component record image;

selectively passing through said transform space a diffracted order of each of said diffraction patterns to provide a plurality of information channels each containing a spatial frequency spectrum associated with a different one of said component record images;

optically deflecting from points in the vicinity of said transform space the light constituting said transmitted diffracted order channels along secondary axes angled with respect to said primary optical axis;

focusing the light constituting said diffracted order channels to reconstruct said component record images at distinct detection planes; and photodetecting the intensity distribution in each of said reconstructed images.

2. A method for detecting at distinct detection planes a plural number of distinct images from a record comprising superimposed images respectively multiplied with a unique spatially periodic modulation, said method comprising:

illuminating the record along a primary optical axis with a beam of light having at least partial coherence at the record;

forming in a Fourier transform space a diffraction pattern of the record spatial frequencies, including a Dirac delta function produced by a periodic modulation convolved with a first spectrum of record spatial frequencies;

selectively passing through said transform space a diffracted order of said delta function pattern to provide an information channel containing said first spectrum of record spatial frequencies;

selectively passing through said transform space the zeroth order of said diffraction pattern to provide an information channel containing a second spectrum of spatial frequencies;

optically deflecting from a point in the vicinity of said transform space the light constituting at least one of said channels along a secondary axis angled with respect to said primary optical axis;

focusing the light constituting said diffracted and zeroth order channels to erect detectable images at respective detection planes; and photodetecting the intensity distributions in each of said erected images.

3. A method for individually retrieving at distinct detection planes a plurality of color separation images stored in superposition upon a colorless record in respective multiplication with a unique spatially periodic modulation for use in color television film reproduction, simultaneous color separation photography, or the like, comprising:

illuminating the record with a beam of light having at least partial coherence at the record;

forming in a Fourier transform space a corresponding plurality of diffraction patterns of the record spatial frequencies respectively associated with said superimposed images, each of said diffraction patterns having a common zeroth order location and being oriented in transform space along a diffraction axis related to the vectorial direction of the associated modulation;

selectively passing through said transform space a diffracted order of each of said diffraction patterns to provide a plurality of information channels each containing a spatial frequency spectrum associated with a different one of said color separation images;

selectively passing through said transform space said zeroth orders of said plurality of diffraction patterns to provide an information channel containing a sum of the spectra associated with said color separation images;

optically deflecting from a point in the vicinity of said transform space the light constituting said transmitted diffracted orders along respective channel axes;

forming a focused image with the light in each of said diffracted and zeroth order channels at respective detection planes; and separately photodetecting the intensity distributions in each of said focused images.

4. The method defined by claim 3 for television film reproduction wherein said detection planes are disposed coincident with the screen of respective cathode ray pickup tubes, and wherein said method includes:

forming respective color separation electrical signals and a monochrome signal corresponding, respectively, to the intensity distributions in said color separations and monochrome images; and combining said signals to form a composite signal.

5. The method of claim 3 wherein said step of separately photodetecting the intensity distributions in each of said focused images comprises making separate color separation exposures on photosensitive materials.

6. A method of color television film reproduction for enabling the televising of full color displays from a colorless record encoded with a plurality of superimposed color separation images multiplied, respectively, with a spatially periodic modulation of unique azimuthal orientation, said method comprising:

illuminating the record with a beam of light having at least partial coherence at the record;

forming in a Fourier transform space a corresponding plurality of diffraction patterns of the record spatial frequencies respectively associated with said superimposed images, each of said diffraction patterns having a common zeroth order location and being oriented in transform space along a diffraction axis related to the vectorial direction of the associated modulation;

selectively passing through said transform space a diffracted order of each of said diffraction patterns to provide a plurality of information channels each containing a spatial frequency spectrum associated with a different one of said component record images;

selectively passing through said transform space said common zeroth order of said plurality of diffraction patterns to provide an information channel containing a sum of the spectra associated with said component record images;

optically deflecting from a point in the vicinity of said transform space the light constituting said transmitted diffracted orders along respective channel axes;

focusing the light in said diffracted and zeroth order channels upon the screens of respective cathode ray pickup tubes;

forming respective color separation electrical signals and a monochrome signal; and combining said signals to form a composite signal.

7. The method as defined by claim 6 including processing said respective signals substantially independently before combining said signals.

8. The method as defined by claim 7 wherein said separate processing includes adjusting said signals to effect color balancing.

9. A system for retrieving at distinct detection planes a plurality of component record images stored on a record in superposition and in respective multiplication with a unique spatially periodic modulation, said system comprising:

light source means for illuminating the record along a primary optical axis with a beam of light having at least partial coherence at the record;

lens means for forming in a Fourier transform space a corresponding plurality of diffraction patterns of the record spatial frequencies including a multiorder Dirac delta function array produced by a periodic modulation convolved with the spectra of a different component record image;

spatial filter means comprising a mask having an aperture for selectively passing through said transform space a diffracted order of each of said diffraction patterns to provide a plurality of information channels each containing a spatial frequency spectrum associated with a different one of said component record images;

optical means for deflecting from points in the vicinity of said transform space the light constituting said transmitted diffracted order channels along secondary axes angled with respect to said primary optical axis;

lens means for focusing the light constituting said diffracted order channels to reconstruct said component record images at distinct detection planes; and photoresponsive means disposed at said detection planes for detecting the intensity distributions in each of said reconstructed images.

10. A system for detecting at distinct detection planes a plural number of distinct images from a record comprising superimposed images respectively multiplied with a unique spatially periodic modulation, said system comprising:

light source means for illuminating the record along a primary optical axis with a beam of light having at least partial coherence at the record;

lens means for forming in a Fourier transform space a diffraction pattern of the record spatial frequencies, including a Dirac delta function produced by a periodic modulation convolved with a first spectrum of record spatial frequencies;

spatial filter means comprising a mask having an aperture therein for selectively passing through said transform space a diffracted order of said delta function pattern to provide an information channel containing said first spectrum of record spatial frequencies, said mask having another aperture therein for selectively passing through said transform space the zeroth order of said diffraction patterns to provide an information channel containing a second spectrum of spatial frequencies;

optical means for deflecting from a point in the vicinity of said transform space the light constituting at least one of said channels along a secondary axis angled with respect to said primary optical axis;

means for focusing the light constituting said diffracted and zeroth order channels to form reconstruction images at respective detection planes; and photoresponsive means disposed at each of said detection planes for separately detecting the intensity distributions in each of said reconstruction images.

11. A system for color television film reproduction for enabling the televising of full color displays from a colorless film record encoded with a plurality of superimposed color separation images multiplied, respectively, with a spatially periodic modulation of unique azimuthal orientation, said system comprising:

light source means for illuminating the record with a light source producing light having at least partial coherence at the record;

lens means for forming in a Fourier transform space a corresponding plurality of diffraction patterns of the record spatial frequencies respectively associated with said superimposed images, each of said diffraction patterns having a common zeroth order location and being oriented in transform space along a diffraction axis related to the vectorial direction of the associated modulation;

spatial filter means comprising a mask having an aperture therein for selectively passing through said transform space a diffracted order of each of said diffraction patterns to provide a plurality of information channels each containing a spatial frequency spectrum associated with a different one of said color separation images, said mask including an aperture for selectively passing through said transform space said zeroth orders of said plurality of diffraction patterns to provide an information channel containing a sum of the spectra associated with said color separation images;

optical means for deflecting from a point in the vicinity of said transform space the light constituting said transmitted diffracted orders along respective channel axes;

means including said lens means for forming a focused image of the light in said diffracted and zeroth order channels upon the screens of respective cathode ray pickup tubes;

means for forming respective color separation electrical signals and a monochrome signal; and electronic matrixing means for combining said signals to form a composite signal.

12. The system as defined by claim 11 including means for processing said respective signals substantially independently before combining said signals.

13. The system as defined by claim 12 wherein said means for separate processing includes means for adjusting said signals to effect color balancing.